April 21, 1964

R. LAPSLEY 3,129,725

LEVELING VALVE

Filed Feb. 8, 1957

INVENTOR.
ROBERT LAPSLEY
BY
ATTYS.

INVENTOR.
ROBERT LAPSLEY
BY
ATTYS.

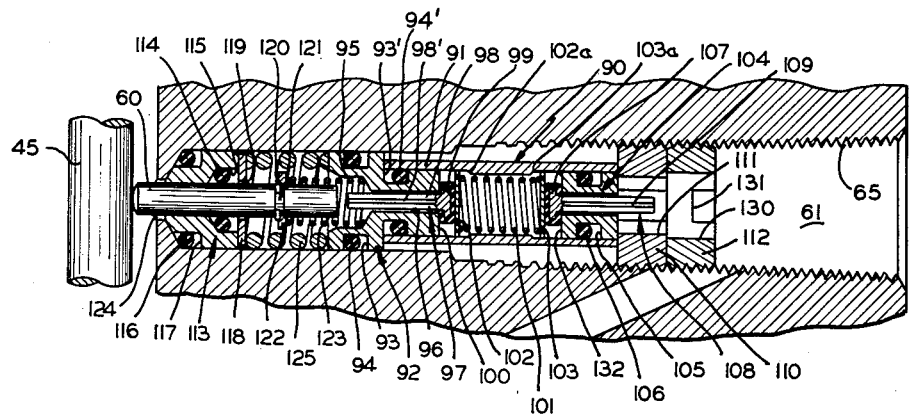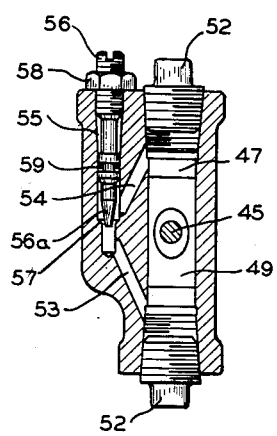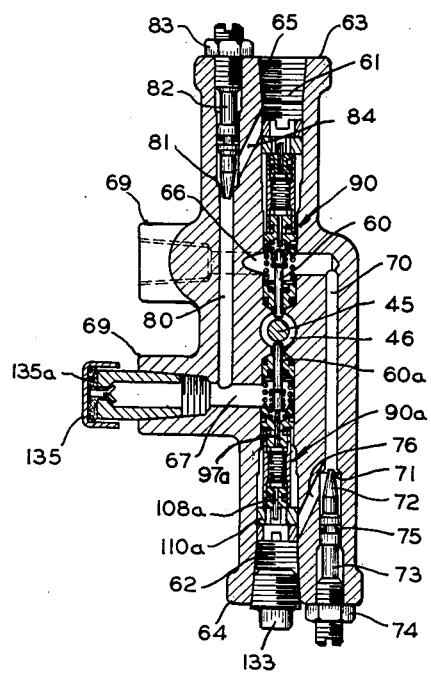

United States Patent Office 3,129,725
Patented Apr. 21, 1964

3,129,725
LEVELING VALVE
Robert Lapsley, Buchanan, Mich., assignor to Clark
Equipment Company, a corporation of Michigan
Filed Feb. 8, 1957, Ser. No. 639,034
16 Claims. (Cl. 137—627.5)

The present invention relates generally to improvements in valve means and more particularly to an improved valve means for controlling the flow and venting of pressurized fluids.

The present invention is further related to and particularly for use with pneumatic suspension systems for vehicles in which air springs provide resilient means for supporting the body of the vehicle upon running axles. Such air springs are usually in the form of annular air cushions or bellows which are inflated or charged with a volume of fluid, preferably air, under sufficient pressure to support the weight of the vehicle body. Relative movement between the body and axle of the vehicle is limited by construction of the suspension system to meet certain spjecifications for accepted operation and appearance. Certain vehicles, such as trucks and buses for example, operate under varying load requirements, therefor necessitating the employment of a compensating control system to regulate the amount of air pressure in the air suspension system. If a constant volume and pressure of air were employed in such a suspension system wherein the vehicle is subject to wide variations in load, it is obvious that at light load the vehicle body would ride too high and at maximum load too low. In order to gain an acceptable medium position for the body and maintain the same in a desired relation with respect to the axle support, a compensating control for charging and venting air from the inflatable bellows is used. The present invention is specifically directed to a valve means associated with such a compensating control for a pneumatically actuated suspension system and like devices.

Briefly, the improved valve of the present invention is directed to a novel combination of elements whereby air or other pressurized fluid may be successfully admitted and vented from a pneumatically operated device, such as an air suspension bellows, automatically in response to variations in a given load condition. In particular relation to the employment of an air suspension system in a vehicle, operation of my valve is in response to variation in the distance between the body and its axle supports. Of additional consequence in my improved leveling valve is the embodiment therewith of an improved dampening system whereby the device employed for actuating the compensating valve control in response to relative movement between the vehicle body and axle operates my valve only in cases where the enlargement or decrease of the desired relative distance is gradual as opposed to momentary violent oscillations or variations in such distance. In other words, the improved leveling valve of this invention includes means for dampening out normal oscillatory motions of the vehicle body with respect to its support axle which are more or less self-compensating, while requiring actuation of my improved valve means in those instances where the movement between the vehicle body and its undersupporting axle system is gradual and positive as in increasing or decreasing the load carried by the vehicle body. Such dampening means in effect therefore is a device for timing the operation of my improved control valve. Additionally, I have included in my present leveling valve a flexible connector means for transmitting motion of an operating lever to a valve operating mechanism which is adjustable to regulate and determine a movement limit for the operating lever before reaction of my valve means takes place.

Other features are also included in the improved valve of this invention directed to the interchangeability of parts for right and left-hand operations to assist in its installation and use along with simplified structural details and arrangement of elements to provide maximum economic advantage in its production and assembly. In brief, the improved leveling valve of this invention comprises two sets of valve cartridge units, each comprising one operating valve and one check valve suitably subassembled as a cartridge unit and tested before being accurately adjusted in their assembled position within a housing. These valves provide for the automatic inflation and deflation of an inflatable bellows or like device; such being inserted into machined chambers formed in the housing thereat with a dampening means arranged to prevent rapid actuation of the valves and to time their operation in response to preselected movements of an operating lever associated therewith. Additionally, a suitable flexible and preloaded connection is made between the operating lever and the valve operating mechanism to permit preselected violent movement of the operating lever without accompanying operation of the valve means. Such features, embodied according to the concepts and teachings of this invention, bring about an improved leveling valve finding particular utility in the circumstances above set forth.

The main object of this invention is to provide a new and improved leveling valve for automatically inflating and deflating a fluid container joined therewith.

Another object of this invention is to provide a new and improved valve of the character aforesaid for use in regulating the inflation and deflation of an air suspension system employed between the body and axle support system of a vehicle.

A further object of this invention is to provide a new and improved leveling valve for use with an air suspension system mounted between an axle and body portion of a vehicle whereby the distance between the vehicle body and axle may be maintained in preselected range, irrespective of the loading of such vehicle body, Still another object of this invention is to provide an improved leveling valve for use in conjunction with an air suspension system of vehicles whereby variations in the load carried by the vehicle are automatically compensated for by supporting force exerted by such air suspension system.

Still another important object of this invention is to provide a new and improved leveling valve for use with a vehicle's air suspension system and the like, which is automatically responsive to inflate and deflate such air suspension system in accordance with the movements of the vehicle body relative to the axle system therefor.

A still further object of this invention is to provide a new and improved leveling valve for use with air suspension or support systems of a vehicle in which means are embodied for adjustably regulating and timing the inflation and deflation of such suspension system in response to movement between the axle and body of the vehicle.

Another object of this invention is to provide a leveling valve in which check valve means are embodied to prevent loss of pressurized fluid in a system controlled thereby.

Still another object of this invention is to provide a leveling valve in which pre-assembled operating and check valve units are insertable in a housing, such units including seats for said valves whereby the same may be pretested independently of the housing and threadingly adjusted in the latter to provide simplicity of manufacture and assembly.

Another object of this invention is to provide improved check and operating valve means embodying means for threading adjustment whereby the same may be adjusted from the exterior of a housing into which the same are mounted to provide a low cost construction.

A still further object of this invention is to provide a leveling valve of the character aforesaid in which the improved operating and check valve units include stop means to prevent preloading of the check valve means thereby to insure free action of the check valve means in admitting pressurized fluid.

The above and further objects, features and advantages of my invention will appear to those familiar in the art from the detailed description which follows taken in reference to the accompanying drawings.

In the drawings:

FIGURE 5 is a cross-sectional view taken substantially along line 5—5 of FIGURE 1 and looking in the direction of the arrows thereon;

FIGURE 6 is another cross-sectional view taken substantially along line 6—6 of FIGURE 1 and looking in the direction of the arrows thereon; and FIGURE 7 is an enlarged, partial plan view with parts thereof in cross section to show details of the control valve assembly employed in my new assembly.

Figure 1:
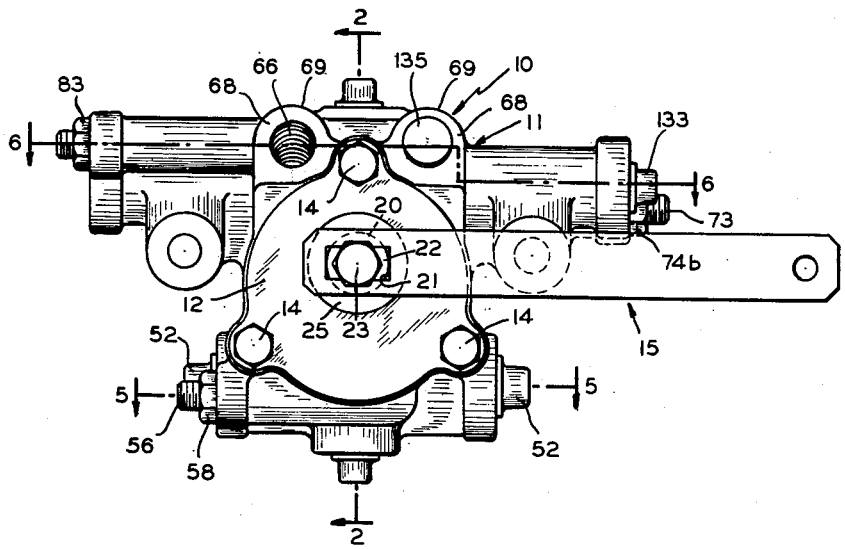
FIGURE 1 is a front elevational view of the improved leveling valve of this invention.

Turning now to the features of the device illustrated in the drawings, and with particular reference to FIGURE 1, it will be understood that my improved leveling valve, indicated generally by numeral 10, includes a main valve housing which may comprise a suitably cast metal body 11 having necessary internal chambers and fittings to locate and hold the several components of my improved assembly in their proper relation so that they may function in a desired sequence. Exteriorly of the housing and adjacent the outer end of a cap plate 12 held to the body 11 by cap screws 14—14 or the like is an operating lever 15 designed to be actuated by relative movement between the body and support axle of a vehicle, such as a truck.

The operating lever 15 is shown in FIGURE 1 in a neutral operating position from whence it is movable arcuately about its connection with a shaft 20 at one end thereof toward first and second limits of movement, as will be explained hereinafter, to determine the admission or venting of pressurized fluid, such as air, to a system to be controlled, for example, to air suspension bellows employed in an air suspension system of a truck or bus.

Connection of the operating lever 15 to the shaft member 20 is made by means of an elongated opening 21 formed through arm 15 and receptive of a correspondingly shaped end portion 22 of shaft 20; operating lever 15 being held to shaft 20 as by a cap screw 23 threaded into shaft 20.

Figure 2:
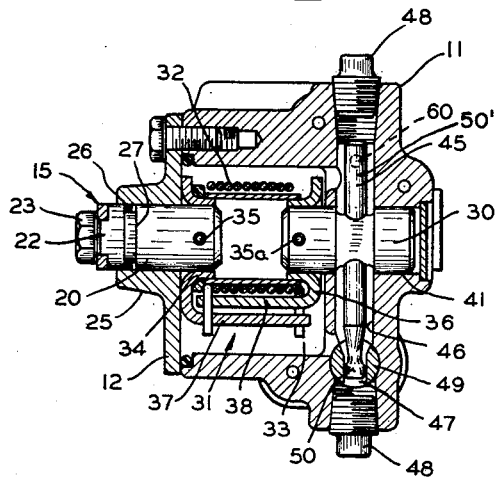
FIGURE 2 is a cross-sectional view taken substantially along line 2—2 of FIGURE 1 and looking in the direction of the arrows thereon.

Shaft 20 is rotatably supported in a bore 41' of tubular boss portion 25 of the cap member 12, as best shown in FIGURE 2 of the drawings. An annular seal comprising an O-ring means 26 is provided in an annular indentation 27 formed in shaft 20 to prevent the escape of liquids around shaft 20.

Since the operating lever 15 is joined to the supporting axle or body of the vehicle to respond to relative movements therebetween, it will be understood that such lever is continually moving at various distances and frequencies. It is also desired, as pointed out previously, that the operation of the improved valve means 10 of this invention be regulated to maintain the air suspension system substantially constant or static regardless of the momentary oscillations of the operating lever. To accomplish this feature, shaft 20 is coupled to a secondary valve actuating shaft 30 by means of a yieldable connection means, indicated generally by numeral 31 (see FIGURE 2).

Figure 3:
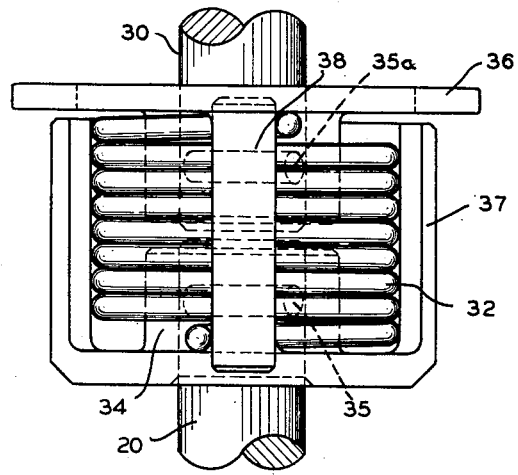
FIGURE 3 is an enlarged partial view in elevation demonstrating the flexible coupling means employed with the valve of FIGURE 1.
Figure 4:
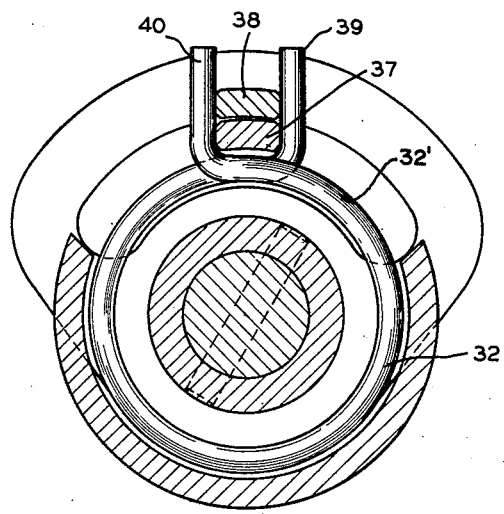
FIGURE 4 is an end-elevational view of the flexible coupling means shown in FIGURE 3.

Such yieldable connection means comprises a torsion spring member 32 housed within a cavity 33 of the valve housing 11 and behind the cover plate or cap member 12. The particulars of this yieldable connection 31 are best shown in FIGURES 3 and 4 of the drawings. One end of spring 32, as shown in such latter figures, concentrically surrounds the hub of a torsion spring container 34 which is fastened to the operating lever shaft 20 as by pin means 35. A second spring container 36 is disposed in a like manner within the opposite end of spring 32 and pinned to the outer end of the valve actuating shaft 30 by pin 35a. The spring containers 34 and 36 each have spring engaging arms 37 and 38, respectively, as shown in FIGURE 4, which extend along the outside of spring 32. Lug ends 39 and 40 of the spring 32 are engaged by both of the spring engaging arms 37 and 38; the two arms 37 and 38 being disposed one radially outward of the other and extending substantially across the length of the torsion spring means 32. So mounted between the two containers 34 and 36, the torsion spring 32 may be placed under torsion or wound up with its end lugs 39 and 40 being disposed between the spring engaging arms 37 and 38, as seen in FIGURE 4. By the use of such a multiple coil torsion spring 32, the same may be preloaded against arms 37 and 38 to actuate shaft 30 sufficiently so that movement of operating lever 15 to its full time position adds only slight additional force to the initial torsion load on shaft 30. This feature prevents overloading of the associated valve actuating parts to be described hereinafter. A flexible connector of this character between the two shafts 20 and 30, while positive, is still sufficiently flexible to permit inaccurate alignment between the shafts 20 and 30, although their coaxial relationship is desirable.

The valve actuating shaft 30 is rotatable in a bore 41 of housing 11. Shaft 30 is distinguished by a cylindrical opening intermediate its ends for receiving a valve actuating rod 45 which extends upwardly through a substantially cylindrical chamber 46 formed perpendicularly through the bearing bore 41 and a cylindrical chamber 47 formed at the lower end of housing 11. As will be recognized from examination of FIGURE 2, in particular, chamber 46 is closed over at its ends by threaded plug means 48—48, while the valve actuating rod 45 housed therein passes through the shaft means 30 so that when the latter is oscillated, the outer ends of the valve actuating rod 45 move arcuately in response therewith. The lower outer end of the actuating rod 45 is coupled to a dash-pot piston 49 in chamber 47 with more or less universal ball joint connection 50 located slightly below the center line of the piston, so that the piston may rotate to compensate for errors in its alignment. Piston 49 reciprocates in the cylindrical chamber 47 which is formed through the valve body 11 transverse to chamber 46 and is plugged over at its opposite ends as by plug members 52—52. As shown in FIGURE 5, a first passageway means 53 communicates with one end of the cylindrical chamber 47, and a second passageway means 54 communicates with the opposite end of chamber 47. Such two passageways are interconnected by a third passageway means 55. The valve body is designed so that fluid may fill the dash-pot cylinder chamber 47, passageway means 53, 54, and 55, and the remaining hollowed-out portions therein, including the vertical chamber 46 which carries the valve actuating arm 45, as well as chamber 33 containing the flexible connector or torsion spring means previously described. With this arrangement, movement of the valve actuating arm 45 and the dash-pot piston 49 attached to its lower end causes fluid at one end of chamber or cylinder 47 to be forced through the passageway means 53, 54, and 55 to the opposite end of the chamber 47. In order to control the rate of this fluid flow and thereby accurately time the movement of the piston 49, an adjustable orifice is provided by a threaded adjusting screw 56 which extends inwardly of one end of the cross-connecting passageway 55. A tapered inner end portion 56a of the adjusting screw means 56 cooperates with an orifice shoulder 57 formed in the passageway means 55 to provide a restrictive orifice. A lock nut 58 is provided exteriorly of the casting 11 around the threaded shank end of the adjusting screw means 56 for holding the same in a desired relationship relative to the orifice shoulder 57. An O-ring 59 is provided intermediate the ends of the adjusting screw means 56 to prevent oil leakage therepast.

With the dash-pot system so provided, oscillations of the operating arm 15 transmitted to shaft 30 and rod 45 via the flexible connector means 31 are considerably dampened due to the flow of oil or other fluid through the passageway means 53, 54, and 55 as restricted by the adjustable orifice means associated therewith. Thus, the timing of the movement for the dash-pot piston 49 may be regulated.

As best shown in the cross-sectional views of FIGURES 2 and 6, the valve actuating rod 45 is engaged adjacent its end 50' by a pair of valve operating pins or push rods 60—60a coaxially aligned and disposed on opposite sides of the chamber 46. Such push rods extend through suitable cylindrical bores formed in the valve housing 11 to communicate at one end with the chamber 46 immediately above the sump well 47. A pair of larger bores or cylindrical chambers 61 and 62 are formed coaxially of the push rods 60—60a, such extending inwardly from opposite end walls 63—64 of the valve housing. Each chamber 61—62 is provided with internal threads 65 which extend inwardly from the outer ends of such chambers and terminate substantially halfway along the length thereof. The chambers 61 and 62 are each traversed by a bore or passageway 66 and 67, respectively, formed inwardly from outer end walls 68—68 of two boss projections 69—69 forming a portion of the housing 11.

Chamber 66 communicates with a cross-connecting passageway 70 formed inwardly from the end wall 64 of the valve housing and provided with an orifice shoulder 71. This orifice shoulder cooperates with a tapered end portion 72 of an adjustment needle valve member 73 threadingly mounted in the outer end of passageway 70 and locked in position by an external lock nut 74. The needle valve member 73 is equipped with an O-ring seal 75 intermediate its ends to prevent the escape of pressurized fluids therepast. A second passageway means 76 communicates between passageway 70 and the bore or chamber 62, as best shown in FIGURE 6. Note in this latter regard that passageway 76 extends from adjacent the outer end of chamber 62 to a point in passageway 70 between its outer end and the orifice shoulder 71 therein. With this arrangement, threaded adjustment of the needle valve member 73 relative to the orifice shoulder 71 serves to regulate the flow to pressurized fluid into passageway 76 and chamber 62.

Bore 67, similar to the arrangement of bore 66, traverses its related chamber 62 adjacent the inner end of the latter and communicates with a cross-connecting passageway means 80 fitted with an orifice shoulder 81 and adjusting needle valve 82 having an external lock nut 83 thereon. A cross-connecting passageway 84 communicates between the passageway means 80 and chamber 61 substantially according to the arrangement previously described for passageway means 70 and 76.

The two described arrangements for establishing communication between the bores 66 and 67 and the outer ends of traversely related chambers 61—62 are substantially similar in all respects in order to provide facility for interchanging the functioning of such passageways, as desired.

Mounted in each chamber, 61 and 62, is one of two air valve assemblies 90—90a shown in greater particular in FIGURE 7 of the drawings. Each air valve assembly 90—90a, is actuated in response to reciprocation of a related one of the push rods 60—60a which are moved by the valve actuating rod 45. The location of such air valve assemblies, one on each side of the valve actuating rod 45, permits movement of the latter toward either valve assembly 90—90a to operate such valve assembly in response to reciprocating activity of its associated push rod 60.

Since the two valve assemblies 90—90a are identical, a description of one will suffice herein. As shown in FIGURE 7, assembly 90 includes a cylindrical cartridge 91 insertable into the chamber 61. A valve seat plug 92 is fitted into the inner end of the cartridge 91, such having an annular recess 93 adjacent one end for housing an O-ring seal 94 which engages the interior cylindrical walls of chamber 61, in the particular illustration of FIGURE 7, to prevent leakage of pressurized fluid therepast. Plug 92 also has a second annular recess 93' carrying a second O-ring seal 94' which makes sealing engagement with the internal walls of the cartridge 91. A recessed bore or cup 95 is formed inwardly of one end of plug 92 to communicate with a smaller axial bore 96 therein leading to the interior of the cartridge 91. A first valve member 97 fits into bore 96; such having a stem portion 98 with lengthwise extending flutes 98' and a rubber covered head 99 adapted to engage face 100 of plug 92 which provides a seat therefor. A valve seat spring 101 is mounted concentrically within cartridge 91 to engage the rear face of a valve seat washer 102, such spring pushing washer 102 against the rubber covered head 99 of the valve member 97.

At the opposite end of the cartridge 91, a second washer 103 is disposed, such being similar in all respects to the first seat washer 102. An annular check valve seat ring 104 bearing an annular recess 105 for holding an O-ring seal 106 is inserted into the outer end of cartridge 96, axially outward of the washer 103. Washer 103 is adapted to engage and seat against an enlarged rubber covered head portion 107 of a check valve member 108; the fluted stem 109 of which extends axially through ring 104. Spring 101 serves no other purpose than to hold the two valve seat washers 102 and 103 against the head ends of respective valve members, and to oppose any force tending to unseat such valve members.

It will be noted that two annular shoulders 102a and 103a are provided in the interior of the cartridge 91. These two shoulders act as limit stops for the inlet and check valve members 97 and 107, the same being engaged by washers 102 and 103, respectively, so that in case of actuation of either valve member 97 or 107, the same are prevented from moving toward each other sufficiently to fully compress spring 101 and prevent operation of the other valve member.

Outwardly of the check valve seat ring 104 is an adjusting nut 110 having a central hexagonal opening 111 therethrough for receiving an Allen wrench. A lock nut 112 is disposed axially outwardly of the adjusting nut 110 to lock the latter in adjusted position along the threads 65, as will be explained presently.

At the innermost end of the chamber 61 is a guide and seal plug 113 axially through which the push rod 60 extends. An O-ring 114 surrounds push rod 60 and seats in a counterbore 115 at one end of plug 113. A second O-ring 116 seats in an annular shoulder 117 formed at the other end of plug 113 to make sealing contact with the walls of chamber 61. A metal retaining washer 118, having a central opening 119 for the passage of push rod 60, partially encloses the open end of the counterbore 115 to maintain the O-ring 114 therein.

One end of push rod 60 extends into chamber 61 coaxially of the cup or bore 95 in valve seat member 92. A snap ring 120 engages in an annular groove 121 formed in the push rod to provide a barrier against which a washer 122 is pressed by a push rod return spring 123 which surrounds rod 60 and engages the bottom of the cup bore 95 at one end. This spring opposes movement of rod 60 toward the stem of valve member 97. The other end of the push rod 60 extends through an opening 124 at the bottom of chamber 61 to invade chamber 46 whereat it is engaged by the valve actuator 45.

Surrounding the push rod 60 is a rather stiff adjusting spring 125 which extends between washer 118 and the opposing end of the valve seat plug 92. Spring 125 opposes the threading movement of the adjusting nut 110 inwardly along the threads 65 in chamber 61. It will be understood that movement of the nut 110 axially inward of chamber 61 serves to move the cartridge 91 and the assembled parts therein toward the push rod 60, thus to regulate the amount of throw required for push rod 60 to unseat the head of valve member 97 from its seat 100. Once the proper axial adjustment for the cartridge 91 has been reached, the adjusting nut is locked in place by the lock nut 112, the latter being formed with a central cylindrical opening 130 communicating with the central axial socket 111 in nut 110. Lock nut 112 is further provided with screwdriver slots 131 so that a tubular screwdriver may be employed to tighten the lock nut against the adjusting nut 110, while the latter is held in a desired, adjusted position with an Allen wrench engaged in socket 111.

In the particular assembled relation of elements illustrated in FIGURE 6 of the drawings, for example, chamber 61 is adapted for connection to an inlet pipe carrying pressurized fluid as, for example, pressurized air supplied from a suitable source (not shown). Due to the fact that the lock nut 112, adjusting nut 110, and check valve seat ring 104 have openings centrally therethrough, pressurized air entering the outer end of chamber 61 unseats the head 107 of the check valve member 108 and displaces the same from the adjacent end wall 132 of the valve seat ring 104. Thus, the cartridge 91 will be filled with pressurized air. If now the push rod 60 is actuated toward the valve member 97, the head 99 of the latter will be lifted from its associated seat provided by the annular surface 100 to permit the passage of air into the area surrounding the push rod 60.

From an inspection of FIGURE 6, it will be seen that the transversely related passageway 66 communicates with the area surrounding the push rod 60, and thus pressurized air is supplied to the passageway 66. In the use intended for the particular embodiment in FIGURE 6, passageway 66 constitutes a supply outlet connected to the bellows of an air suspension system, for example. In addition to supplying pressurized air to passageway 66, air is also supplied to passageways 70 and 76, so as to enter the outermost end of chamber 62 adjacent the close-off plug 133 in its outer end. The valve assembly 90a in chamber 62 operates in the same manner as that described for assembly 90, so that pressurized air entering chamber 62 via passageway 76 will lift the check valve 108a therein to build up pressure within the cartridge 91a of this assembly. Thereafter reverse movement of the actuating rod 45 to engage its end portion 50' with the second push rod 60a will cause a lifting of the control valve member 97a permitting passage of pressurized air into transverse passageway 67.

Passageway 67 is closed over at its outer end by a vent plug 135 having a suitable opening therethrough for the escape or venting of air to the atmosphere through a filter 135a. In this regard, it will be recalled that passageway 70 has an orifice shoulder 71 which cooperates with an adjusting screw 73 in passageway 70 to provide regulation or restriction to the flow of pressurized air being vented to atmosphere. It will also be recalled that passageway 67 communicates with a secondary passage 80 leading to the outer end of chamber 61 by a third passageway 84. However, with the passageway 67 dedicated for venting purposes, passageway 80 is effectively closed off by threadingly adjusting the valve adjusting screw 82 sufficiently inward toward the orifice seat 81 therein to block over and prevent the escape of air into chamber 61, and vice versa.

With the aforedescribed arrangement, it is believed that those familiar with the art will readily understand the operation of my improved valve as thus described. Of particular importance in the structural aspects of this invention is the provision for interchange of parts and function. In particular, I have in mind the reversing of the operating arm 15 on shaft 20, so as to provide for a left or right-hand installation. Also, it will be understood that in the construction of the valve housing 11, the chambers 61 and 62 therein are identical, as are the passageway means related therewith and particularly the passageways 66 and 67. Thus if the need arises, the vent plug 135 may be removed from chamber 67 and placed in chamber 66, plug 133 may be removed from chamber 62 and placed in the outer end of chamber 61. Chamber 62 thereafter may be used as the inlet chamber. In this manner, reverse operation of the two valve assemblies 90 and 90a may be undertaken so that valve assembly 90a may act as the supply control valve and valve assembly 90 the vent control valve. It will also be appreciated that by the provision of the adjusting screw means 73 and 82 a convenient and simple means for regulating the flow of air to the vent plug 135 is available and the adjustable features of the valve assemblies 90 and 90a, as provided by adjusting nuts 110—110a, serves to regulate the acutation and particularly the opening of the valve seal washers in response to reciprocation of push rods 60—60a.

By the unique cooperation and arrangement of the several elements described, I provide a leveling valve assembly having two check valves and two operable control valves, suitably interconnected by passageway means to join the outlet chember of the first control valve with the inlet chamber of the second control valve and the outlet chamber of the second valve to the inlet chamber of the first control valve. As stated, the presence of the adjusting screws 73 and 82 serve to regulate the flow of air between the inlet and outlet chambers of such operable valves to provide improved versatility of control in a valve of this character.

The presence of a dash-pot arrangement prevents rapid movement of the valve actuating rod 45, while the valve operating arm 15 may move any desired distance in either direction from its neutral position without actuating a control valve, so long as such movement is accomplished and the operating arm returned to neutral in less time than is required for the dash-pot piston 49 to move sufficiently to allow actuation of one of the two valve assemblies 90 or 90a. Also, movement of the valve operating lever or arm 15 without accompanying movement of the valve actuation rod 45 is permitted by the inclusion of the torsion spring coupling means which acts to load the actuating arm in response to oscillations of the operating lever with the load so imposed on the actuating rod being dampened by the regulated timing of the dash-pot piston. In this regard, it is to be noted that no outstandingly heavy loads may be imposed on the dash-pot piston, since the only actuating force transmitted thereto is that of the torsion provided by the torsion spring arrangement. This feature protects the dash-pot and operating valves from abuse and contributes greatly to trouble-free and dependable operation.

Thus, it will be understood that I have herein described and disclosed the features of an improved leveling valve assembly having unique features of adjustability and operation. While I have shown and described this valve in association with a preferred form thereof, it is to be understood that numerous changes, modifications and substitutions of equivalents may be made therein without necessarily departing from the spirit and scope of its inventive aspects. As a consequence, it is not my intention to be limited to the particular form of device herein de-

I claim:

1. In a leveling valve for controlling the admission and venting of air to bellows of an air suspension system and the like, the combination comprising, a valve housing, opposed chambers formed in said housing, valve means in each of said chambers, inlet and outlet means at opposite ends of each of said chambers, passageway means communicating between the outlet end of one of said chambers and the inlet end of the other of said chambers, oscillatable actuator means disposed between the said two chambers, means extending between said actuator means and each of said valve means and constituting a lost-motion connection therebetween for operating the said valve means alternately in response to predetermined oscillation of said actuator means, means dampening the oscillations of said actuator means, oscillatable operator means spaced from said actuator means, a torsion spring connecting said operator means to said actuator means for transferring torsional force from said operator means to said actuator means, the inlet of said one chamber being supplied with pressurized air and the outlet thereof adapted to communicate with a suspension means to be operated and vent means communicating with the outlet of said other chamber, operation of the valve means in said one chamber permitting passage of pressurized air to the outlet thereof and said first passageway means such that the subsequent operation of the valve means in the other of said chambers serves to vent the pressurized air to atmosphere.

2. In a leveling valve having a pair of operating control valves therein for controlling the admission and venting of fluid under pressure, a means for actuating such control valves comprising in combination, an oscillatable operating lever, a first shaft oscillatable with the movement of said operating lever, a second shaft coaxial with said first shaft and spaced therefrom, a torsion connector between said two named shafts including torsion transmitting spring means, an actuating rod connected to said second shaft, movement dampening means connected to one end of said actuating rod for impeding movement thereof as induced by oscillations of the said operating lever and first shaft, and means engaging said actuating rod and having lost-motion connection with the valves for operating the two control valves alternately in response to predetermined movement of said actuating rod.

3. In a leveling valve for controlling the admission and venting of pressurized fluid to a system to be operated, the combination comprising, a valve housing, a pair of control valves disposed in said housing on opposite sides of a central chamber therein, push rod means invading said central chamber from the opposite sides thereof and having lost-motion connection with respective ones of said control valves, an actuating rod disposed in said chamber and engaging between said push rod means for selectively operating said control valves, movement dampening means connected to said actuating rod for timing and regulating the movement of the latter, a first shaft means having connection with said actuating rod for driving the same with arcuate pivotal oscillating motion, the axis of said shaft means serving as the pivot center for said actuating rod, a second shaft means spaced from said first shaft means and having connection with a source of oscillating motion, and a torsion spring interjoining said two shaft means, the said torsion spring serving to move said first shaft means in response to sustained displacement of said second shaft means in one direction or the other, said torsion spring substantially absorbing rapid oscillations of said second shaft means and the lost-motion connections of said push rod means with said valves accommodating slight movement of said actuating rod without causing actuation of said valves, whereby said valves are actuated only in response to sustained displacement of said second shaft means.

4. In a leveling valve for controlling the admission and venting of pressurized fluid to a system to be operated, the combination comprising, a valve housing, a pair of control valves disposed in said housing on opposite sides of a central chamber therein, rod means invading said central chamber for engaging said valve means, an actuating means disposed in said chamber and adapted to engage said rod means alternately thereby to operate said valve means alternately, first and second passageway means fitted with selective shut-off means interconnecting opposite ends of the control valves whereby pressurized fluid at the outlet end of one control valve is transmitted to the inlet end of the other control valve, check valve means disposed adjacent each of said control valves at the inlet end thereof, said check valve means being disposed between the inlet of the respective control valve and one of said passageway means communicating with such inlet for preventing reverse flow of fluid past the respective control valve, the outlet of said one control valve supplying pressurized fluid to a system to be operated, and vent means supplied by the outlet of said other control valve whereby pressurized fluid supplied to the system to be operated may be vented to atmosphere at the opening of said other control valve.

5. In a leveling valve for controlling the admission and venting of pressurized fluid to a system to be operated, the combination comprising, a valve housing, a pair of operating control valves disposed in said housing at opposite sides of a central chamber therein, means for operating said control valves one at a time, the outlet end of one of said control valves supplying pressurized fluid to the system to be operated, vent means disposed at the outlet end of the other of said control valves to vent pressurized fluid thereat to atmosphere, passageway means interconnecting the outlet end of said one control valve and the inlet end of said other control valve whereby pressurized fluid at the outlet end of said one control valve is transmitted to the inlet end of the other control valve, check valve means adjacent each of said control valve means between the same and the inlet supply therefor for preventing reverse flow of pressurized fluid past said control valves, spring means engaging each control valve and its associated check valve means, and stop means interposed between each control valve and its associated check valve means whereby the movement of either control valve toward its associated check valve means, and vice versa is limited to prevent preloading of said control valve and check valve means by said spring means to a degree preventing its free opening operation.

6. In a valve assembly for controlling the admission and venting of pressurized fluid in a system connected thereto, a main housing, two coaxial valve locating chambers in said housing, a pretested valve assembly located centrally of each chamber and each including an operable valve at its inner end and a check valve at its outer end, resilient seal means between each valve assembly and the walls of its related chamber, a centrally located valve actuating lever, a push rod between said actuating lever and each operable valve, return spring means for each push rod, spring means between the inner end of each valve assembly and said housing for normally spacing the operable valve of the respective assembly from the respective push rod, location adjusting means bearing against the outer end of each valve assembly and threadingly engaging the related chamber for varying the spacing between the respective operable valve and the respective push rod, an inlet port at the outer end of each valve assembly, an outlet port at the inner end of each valve assembly, fluid passageways connecting the inlet port of one valve assembly with the outlet port of the other valve assembly, and externally adjustable means in each passageway for selectively closing or opening the same as required for operation of the valve assembly.

7. Valve means comprising a valve housing, a pair of control valves disposed in said housing on opposite sides of a central chamber therein, rod means invading said central chamber from the opposite sides thereof and operatively associated with respective ones of said valves, an actuator disposed in said chamber between said rod means for engaging the same and operating one or the other of said valves, each valve having an inlet end and an outlet end and controlling fluid flow therebetween, first and second passageway means interconnecting opposite ends of the control valves, selective shut-off means for said passageway means for blocking one and opening the other whereby pressurized fluid at the outlet end of one control valve is transmitted to the inlet end of the other control valve, the inlet and outlet ends of said one control valve constituting respectively the inlet and outlet of the valve means, and vent means at the outlet end of said other control valve whereby pressurized fluid supplied via the outlet end of said one valve to a system to be operated may be selectively vented at the outlet of said other valve.

8. In valve means as set forth in claim 7, said selective shut-off means comprising orifice restricting means in each of said passageway means whereby the flow of pressurized fluid between the outlet and inlet ends of said two control valves may be restrictively adjusted and interrupted as selected.

9. Valve means comprising a housing having a bore therein, one end of said bore comprising the valve inlet, a transverse passage in said housing communicating with said bore adjacent the other end thereof and comprising the valve outlet, a pre-assembled valve unit slidably mounted in said bore between said inlet and said outlet, said unit including cylinder means having a valve seat at each end thereof, an inwardly opening control valve at the outlet end of said cylinder, an inwardly opening check valve at the inlet end of said cylinder and a spring disposed between said valves and normally biasing the same away from one another and onto their seats, a push rod extending slidably into said bore from said other end thereof for engaging said control valve and unseating the same, a spring between said valve unit and said housing at said other end of said bore for normally spacing said control valve from said push rod, and a nut adjustably threaded into said one end of said bore and engaging said valve unit for varying the spacing between said push rod and said control valve.

10. Valve means as set forth in claim 9, including a second bore in said housing substantially aligned with and opposed to said other end of the first named bore and a second valve unit mounted in said second bore, a central chamber in said housing extending between the adjacent ends of said bores, the push rods of said valve units extending into said chamber substantially in juxtaposed relation, and an actuator disposed within said chamber and extending between the juxtaposed ends of said push rods, said actuator being movable within said chamber for actuating said push rods selectively to open and accommodate closing of the control valves of the two valve units, the adjusting nuts of the two valve units being individually adjustable to regulate opening and closing of the respective control valve.

11. A control device comprising, a housing having a first bore, a second bore intersecting said first bore transversely thereof, opposed valve means at one end of said second bore, damping means at the other end of said second bore having a predetermined rate of movement, a plug rotatable in said first bore and extending transversely of said second bore, a rigid member in said second bore attached to said plug and having opposite ends adapted for engagement with said valve means and damping means, a shaft rotatable in said first bore and coaxially disposed to said plug, a first lever means attached to said shaft, a second lever means attached to said plug, and a coiled torsion spring resiliently connecting said levers whereby synchronous movement of said levers is limited by the rate of movement of said damping means upon actuation of said shaft.

12. A control device according to claim 11 wherein said first and second lever means each have a portion extending substantially parallel to the axis of said shaft and plug.

13. A control device according to claim 12 wherein said torsion spring has a helical portion surrounding said shaft with opposite ends engaged on opposite sides of the parallel portions of said lever means.

14. A control device according to claim 13 wherein the valve means comprises two oppositely acting normally inactive valves, one of which is actuated by movement of said first lever means in one direction and the other of which is actuated by movement of the first lever means in the opposite direction.

15. A control device for regulation of air in an expansible bellows for a vehicle suspension system comprising, a unitary housing having a first bore, a second bore intersecting said first bore transversely thereof, opposed air valve means at one end of said second bore, piston means at the other end of said second bore, means for passage of a fluid between said first bore and piston means, a plug rotatable in said first bore and extending transversely of said second bore, a rigid member extending transversely of said plug and having opposite ends for engagement with said valve means and said piston means respectively, and a resilient torsion member in said first bore to selectively rotate said plug and actuate said air valve means.

16. A control device comprising a unitary housing having a first bore, a second bore intersecting said first bore transversely thereof, opposed valve means at one end of said second bore, damping means at the other end of said second bore, a plug rotatable in said first bore and extending transversely of said second bore, a rigid member in said second bore attached to said plug and adapted for engagement with said valve means and damping means respectively at opposite ends thereof, said damping means providing a time-delayed movement of said rigid member, and a resilient torsion member in and extending longitudinally of said first bore to selectively rotate said plug and actuate said valve means.

References Cited in the file of this patent

UNITED STATES PATENTS

| | | |
|---|---|---|
| 492,192 | Creque | Feb. 21, 1893 |
| 1,196,349 | Gilbert | Aug. 29, 1916 |
| 1,954,662 | Bond | Apr. 10, 1934 |
| 1,956,981 | Crowley | May 1, 1934 |
| 2,054,183 | Ackeren | Sept. 15, 1936 |
| 2,099,244 | Temple | Nov. 16, 1937 |
| 2,408,274 | Schleicher | Sept. 24, 1946 |
| 2,559,886 | Loweke | July 10, 1951 |
| 2,670,201 | Rossman | Feb. 23, 1954 |
| 2,819,777 | Kosch | Jan. 14, 1958 |
| 2,905,430 | Deist | Sept. 22, 1959 |
| 2,905,462 | Christensen | Sept. 22, 1959 |

FOREIGN PATENTS

| | | |
|---|---|---|
| 1,101,471 | France | of 1955 |